United States Patent [19]

Devos et al.

[11] Patent Number: 4,792,982
[45] Date of Patent: Dec. 20, 1988

[54] INTEGRATED RETINA HAVING A PROCESSORS ARRAY

[75] Inventors: Francis Devos, Les Ulis; Patrick Garda, Thiais; Bertrand Zavidovique, Paris, all of France

[73] Assignee: Centre National de la Recherche Scientifique, Paris, France

[21] Appl. No.: 875,078

[22] Filed: Jun. 17, 1986

[30] Foreign Application Priority Data

Jun. 18, 1985 [FR] France ................ 85 09256

[51] Int. Cl.[4] ........................ G06K 9/20; G06K 9/28
[52] U.S. Cl. .................................... 382/68; 382/41; 358/213.29
[58] Field of Search .............. 382/68, 41; 358/213.29

[56] References Cited

U.S. PATENT DOCUMENTS

| | | | |
|---|---|---|---|
| 3,683,193 | 8/1972 | Weimer | 358/213.29 |
| 4,565,928 | 1/1986 | Yamamoto et al. | 358/213.29 |
| 4,589,026 | 5/1986 | Ozawa et al. | 358/213.29 |
| 4,628,364 | 12/1986 | Koch | 358/213.29 |

FOREIGN PATENT DOCUMENTS 2539529  1/1983  France .

OTHER PUBLICATIONS

Savvas G. Chamberlain, "Advances in C.C.D. Scanners with On-Chip Signal Processing for Electronic Imaging", *The Radio and Electronic Engineer* 50 (May 1980) 249–257.

P. Jespers, "A Two-Chip Imaging System for OCR Applications," *IEEE J. Solid-State Circuits*, vol. SC-16, pp. 168–174, Jun. 1981.

*Primary Examiner*—Theodore M. Blum
*Attorney, Agent, or Firm*—Lowe, Price, LeBlanc, Becker & Shur

[57] ABSTRACT

The retina is constituted by an array of cells formed on a substrate and each comprising a photosensitive element, means for converting a signal delivered by the photosensitive element into a binary information, storage means connected to the converting means and an elementary processor formed on the substrate and connected to the storage means. The storage means are arranged as a bidimensional array of shift registers to allow transfer of binary information from one cell to the neighboring ones, and the shift registers and elementary processors are connected in parallel to control inputs so as to control the acquisition of an image by simultaneously storing of the binary informations, the realization of simultaneous and parallel processings on the stored binary informations, and the write-in of the results in the storage means. Thus, successive processing steps of the image can be performed on the retina itself, the image being re-written on itself after each step.

6 Claims, 3 Drawing Sheets

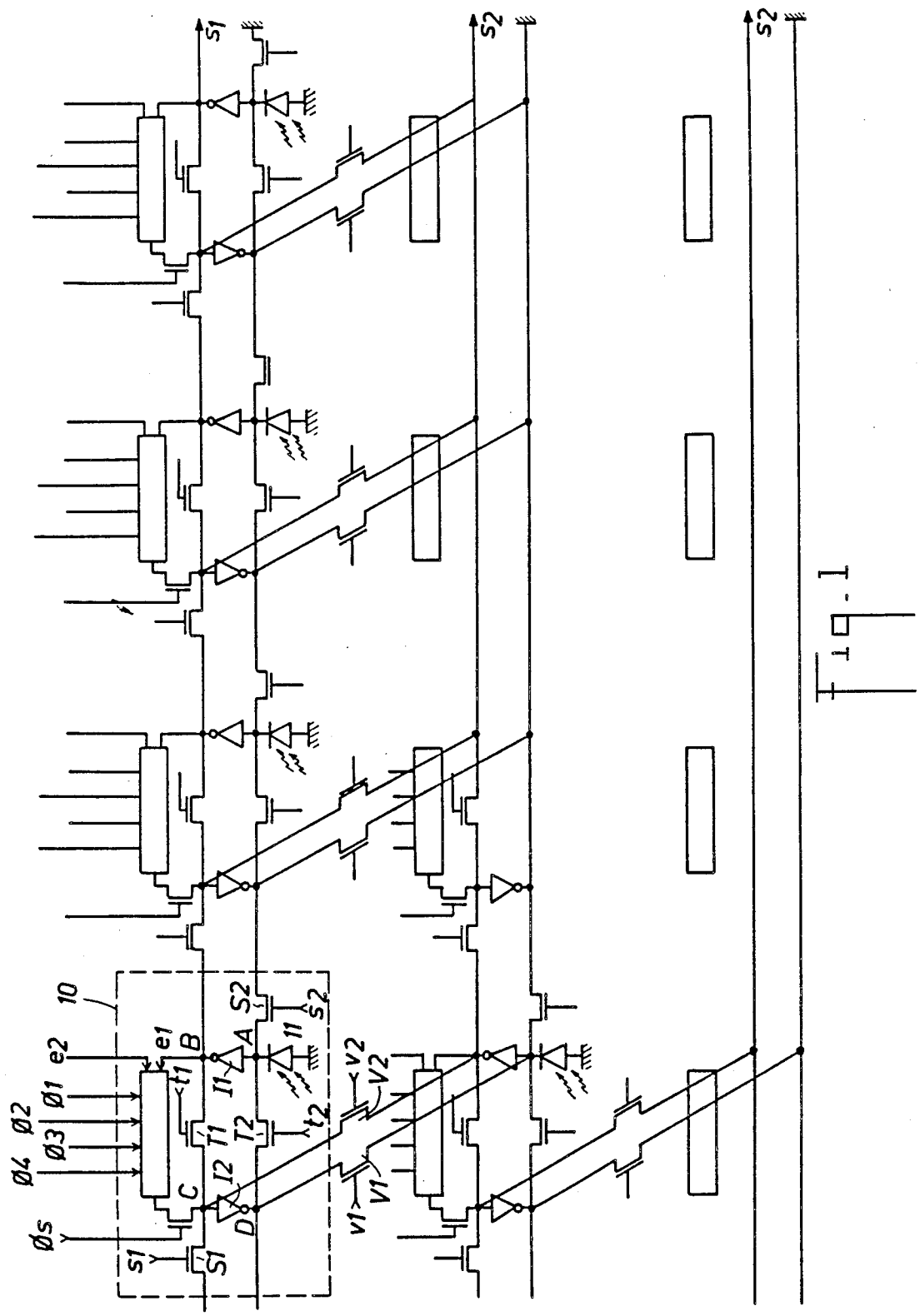

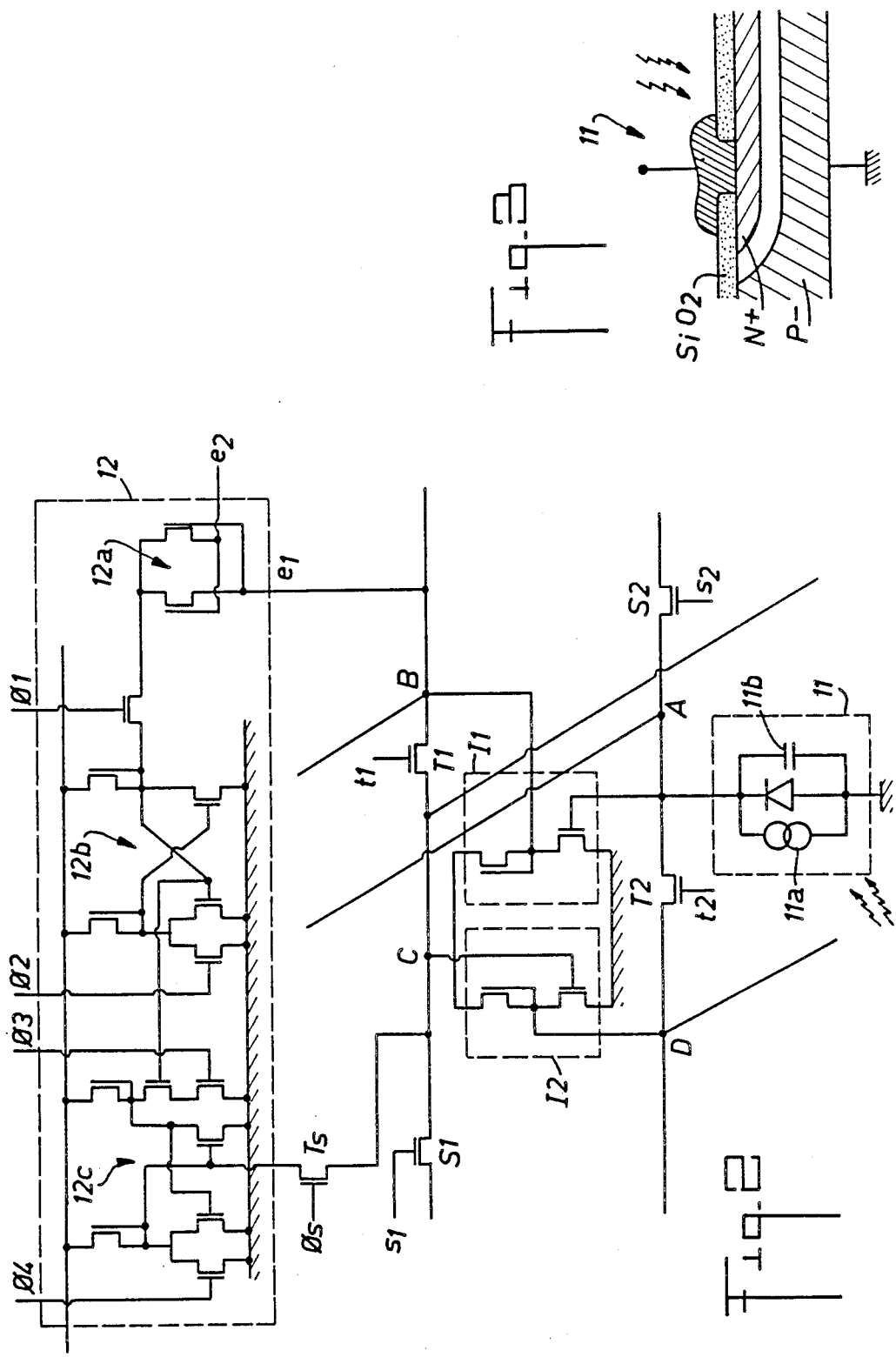

INTEGRATED RETINA HAVING A PROCESSORS ARRAY

The present invention relates to an integrated photoelectric sensor, or retina, of the type constituted by an array of cells formed on a substrate.

The field of application of the present invention is that of the acquisition and processing of images, in particular, but not exclusively, for pattern recognition and/or localization.

The current systems of image acquisition and processing generally use analog sensors such as photodiode arrays wherefrom information is extracted in analog form for subsequent serializing, digitalizing and storing in order to constitute a binary image for subsequent processings.

One particular class of operators for binary image processing is constituted by algorithms of Neighborhood Combinatorial Processings (NCP) to transform a given image in a binary image result. The geometrical operators of the plane discrete mathematical morphology are the most widely used examples of such algorithms. The binary value of each element, or pixel, of the image result is determined from values of the corresponding pixel and of its neighbours in the given image, and in particular by boolean combination with series of predetermined elementary image patterns depending on the patterns to be recognized or localized in the image to be treated, the pixels of said elementary images being worth "L", "H" or any value.

The NCP algorithms (or other image processing operators), such as currently used on digitalized images require important or specialized processing means (table processors) and are costly both in time and equipment.

To acquire images, it has been proposed to integrate on a same substrate the photosensitive elements together with analog-digital converting means and storage means accociated to the different photosensitive elements. A digitalized image is thus directly available at the output of the retina, but no saving is made on the image-processing time and means.

Therefore it is the object of the present invention to propose an integrated retina which will permit a simplification of the means for processing the acquired images with a substantial reduction of the processing time.

A further object of the invention is to propose an integrated retina which is particularly adapted to the processing of images by NCP algorithms.

These objects are reached with a retina including an array of cells formed on a substrate and wherein, according to the invention:

each cell comprises a photosensitive element for supplying a signal representative of the value of one element of the image formed on the retina, converting means connected to the photosensitive element for converting said signal into a binary information and storage means connected to said converting means for storing said binary information and an elementary processor formed on said substrate and connected to said storage maans of the cell;

the storage means are arranged as a bidimensional array of shift registers to allow the transfer of the binary information from one cell to any neighboring cell, the shift registers and elementary processors are connected in parallel to control inputs so as to control the acquisition of an image by simultaneous storing of the binary information representing the values of the elements of said image, the realization of simultaneous and parallel processings on the stored binary information, and the write-in of the results in the storage means.

Thus, one essential characteristic of the retina according to the invention, consists in the integration of a bidimensional communication array and elementary processors array on the very substrate where the photosensitive elements, the converting means and the associated storage means are formed. Such structure is particularly well suited for use with NCP algorithms. Indeed, said latter are constituted of operations which are conducted in parallel on the different pixels of one image to be treated, and which use the value of said pixels and those of their neighbor. Thus, by a control in parallel of the shift registers and of the elementary processors, the elementary operations of the NCP algorithms can be carried out in the retina itself. It all happens as if the digitalized starting or given image was moved in front of the array of fixed processors to bring to the latter the binary information necessary to work out the value of each pixel of the resulting image.

According to another remarkable feature of the invention, the values of the pixel of the resulting image are stored in the cells of the retina in place of the values of the pixels of the starting image. Then it is possible to conduct several successive conversions of an image, by re-writing the image over itself, this authorizing the realization of a complex neighbourhood combinatorial processing by decomposing it into a sequence of elementary neighborhood combinatory processings. Said latter only require an elementary processor of simple and nonvoluminous structure, readily integrable on the retina.

The invention will be more readily understood on reading the following description with reference to the accompanying drawings in which:

FIG. 1 is a diagram of an array constituting a retina according to one embodiment of the invention;

FIG. 2 is a more detailed diagram of a cell of the array shown in FIG. 1;

FIG. 3 is a partial cross-section of the embodiment of the photosensitive element;

Figure 4:
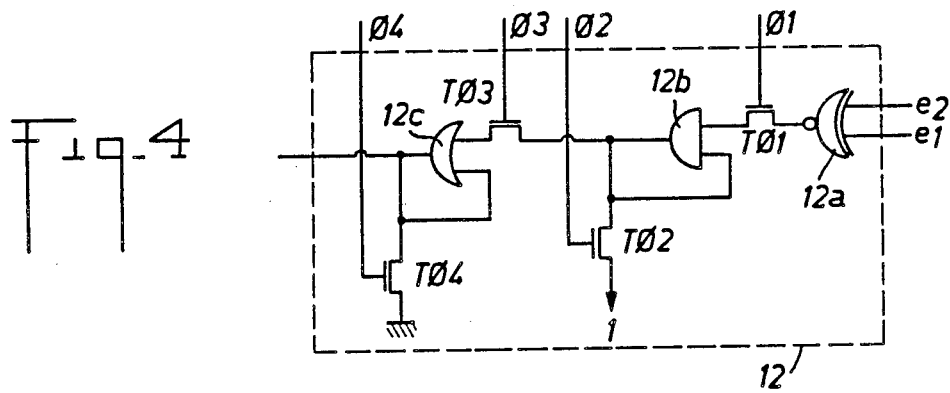
FIG. 4 is a functional diagram of the elementary processor of a cell from the array of FIG. 1.

Referring first to FIG. 1, this shows a retina according to the invention constituted by an array of identical cells 10 integrated on the same substrate and interconnected.

Each cell 10 (FIGS. 1 and 2) comprises a photosensitive element 11. This may be constituted by a photodiode which, in NMOS technology, is for example realized by a N+ diffusion in a P− substrate (FIG. 3). It is indeed known that such diffusions, even through the passivation layer (SiO$_2$), constitute vertical photodiodes. Advantageously, the photodiodes 11 are materialized by using conductive N+ layers formed in the substrate to interconnect the cells, as will be described hereinafter.

In FIG. 2, the photodiode 11 is shown with, in parallel, a current source 11a and a stray capacity 11b, between the earth and a connection point A. The current of source 11a is the leakage current of the stray capacity 11b. Said latter having been preloaded to a preset level, the intensity of the leakage current is a function of the illumination intensity of the photodiode. Thus, after a predetermined exposure time, the level of charge of capacity 11b, namely the voltage at point A, represents the value of the image element projected on the surface zone of the retina where the diode is located.

The voltage at point A is applied to a circuit for analog-to-digital conversion and storage, comprising an inverter I1 connected between point A and a connecting point B, two transistors T1, T2 of which the output circuits are respectively connected between point B and a connecting point C and between point A and a connecting point D, and a second inverter I2 connected between point C and point D. Inverter I1 constitutes an analog-to-digital converter element, converting the voltage at point A into a binary information taking on the value "L" or "H", depending on whether the voltage at point A is higher or lower than the operating threshold value of the inverter. Digitalization of the pixel is then conducted by comparison to a threshold.

The comparison may, if necessary, be non-uniform over the whole of the retina. This is obtained by giving different sensibilities to the photodiodes-digitalizing inverters assemblies depending on their location in the retina. Various means may be used to this effect, such as, for example, a selective masking of photosensitive areas, a differentiating of the pre-charge voltages of the stray capacities, a differentiating of the thresholds of the converters (differentiating of the inverters I1 formed on the substrate), or even a modulation of the exposure times. By making a group of cells with different thresholds instead of one cell, corrsspond to each pixel of the image to be processed, it becomes possible to realize a coding of the image which is multivalue, interpretation-wise, but which remains binary structurewise (B code).

Inverters I1, I2 make up, with transistors T1, T2, a storing circuit for the binary information obtained by converting the voltage at point A. Storing is realized by copying the information through inverters I1, I2, by alternate switching of transistors T1, T2 controlled by signals t1, t2.

According to one characteristic of the invention, the storing circuits of the cells 10 are arranged as a bidimensional array of shift registers. To this effect, the cells are connected in lines via transistors S1, S2 connecting respectively points B and A of one cell to points C and D of the next cell on the right, and in column,, via transistors V1, V2 connecting respectively, points D and C of one cell to points A and B of the next cell below. Transfer of information from one cell to another is controlled by means of control signals s1, s2,t1, t2, v1, v2 applied to transistors S1, S2, T1, T2, V1 and V2. Thus, a shift to the right is controlled by closing S1 and T2, a shift to the left by closing T1 and S2, a shift upwards by closing V2 and T1, a shift downwards by closing T1 and V1, a shift in diagonal downwards and to the right by closing S1 and V1 and a shift in diagonal upwards and to the left by closing V2 and S2.

According to another important characteristic of the invention, each cell 10 comprises an elementary processor 12 integrated on the same substrate. Clock slgnals $\phi1$, $\phi2$, $\phi3$, $\phi4$ and a data signal e2 are applied in parallel to the different processors by means of control and data conductors formed on said substrate. Each procesoor 12 further receives, on a second data input, the information e1 stored in the storing circuit of the cell and available at point B. Finally, a data output of processor 12 is connected via transistor Ts to point C of the storing circuit so as to be able to write-in, in the latter, the information representing the result of the processing carried out by the processor. The closure of transistor Ts is controlled by a signal $\phi s$.

As already indicated, the integrated retina according to the invention is particularly suited for use with algorithms of neighborhood combinatorial processings(NCP). These may be decomposed into elementary processings, the realization of which only requires relatively simple means, readily integratable in each cell. Each of said elementary processings comprises, in general, a sequence of boolean operations affecting the binary information representing the pixel to be processed, the binary information representing the neighborhood pixels and binary date representing small elementary images predetermined as a function of a pattern to be recognized or located in the image to be processed. Each of these binary data is addressed to the different cells in order to carry out the required processings in parallel in the different cells, the image being shifted in front of the array of processors as a function of said processings, appropriately by controlling the shift registers. At the end of each processing, the result for each pixel is entered in the corresponding storing circuit, for possible subsequent processing. Thus, each image is converted successively on itself. The massive and natural parallelism in which the NCP algorithms are performed on all the pixels of the image procures both power and rapidity of processing. Once the processings are completed, the information is retrieved line by line, on the edge of the retina, by controlling the shift registers. The binary values are, for each column, available on the output terminals S1, S2, S3 . . . , in order to be serialized and stored for subsequent processings.

One embodiment of the elementary processor 12 is now described in more details, with reference to FIG. 4. A comparator 12a, formed by an EXCLUSIVE-NOR gate, receives signals e1 and e2 and has its output connected via a transistor $T\phi1$ to an input of an AND gate 12b with two inputs. The output of gate 12b is connected, on the one hand, to the second input of said gate, and on the other hand, via a transistor $T\phi3$, to an input of an OR gate 12c with two inputs. The output of gate 12c is connected to the second input thereof and constitutes the data output of the processor 12. Transistors $T\phi2$ and $T\phi4$ controlled by signals $\phi2$ and $\phi4$ are respectively connected between the output of gate 12b and a point at the high logic level (H) and between the output of gate 12c and the earth (L level). The transistors $T\phi1$ and $T\phi3$ are controlled by signals $\phi1$ and $\phi3$.

Comparator 12a makes comparisons between data values e2 and the values e1 representing the pixel of the corresponding cell, or that of a neighborhood cell after a shifting of the information. For each cell, a processing phase, consisting in the combination of a small predetermined elementary image with the image formed on the retina, contains a series of comparisons between the pixels of the small elementary image and those occupying the same relative positions in the processed image.

At the beginning of the processing, the output of AND gate 12b is initialized at level H(switching on of $T\phi2$). The results of successive comparisons for the processing of one small image are transmitted to gate 12b by successive switchings on of $T\phi1$. As long as the results are positive (output of the comparator at level H), the output of gate 12b remains H, but as soon as a result is negative (output of the comparator at level L) the output of gate 12b is turned to L and remains at this level until the end of the series of comparisons which corresponds to the processing of the small elementary image, since said output is looped back in input of gate 12b.

The OR gate 12c has its output initialized at a low level (L) by switching on of Tφ4. At the end of each series of comparisons, the output of gate 12b is connected to the first input of gate 12c by switching on of transistor Tφ3. If during the processing of severe small elementary images, the output of gate 12b is at level H, at the end of at least one series of comparisons (indicating the recognition of the pattern of one of the small elementary images in the image formed on the retina), the output of gate 12c passes to level H and remains at this level due to its looping back in input of gate 12c.

As it is apparent from FIG. 2, the elementary processor whose functional diagram is shown in FIG. 4 requires a relatively low number of transistors, this making the integration in each cell of the retina very easy.

Understandably, other embodiments of elementary processors may be used to carry out the required boolean combinations.

Figure 5:
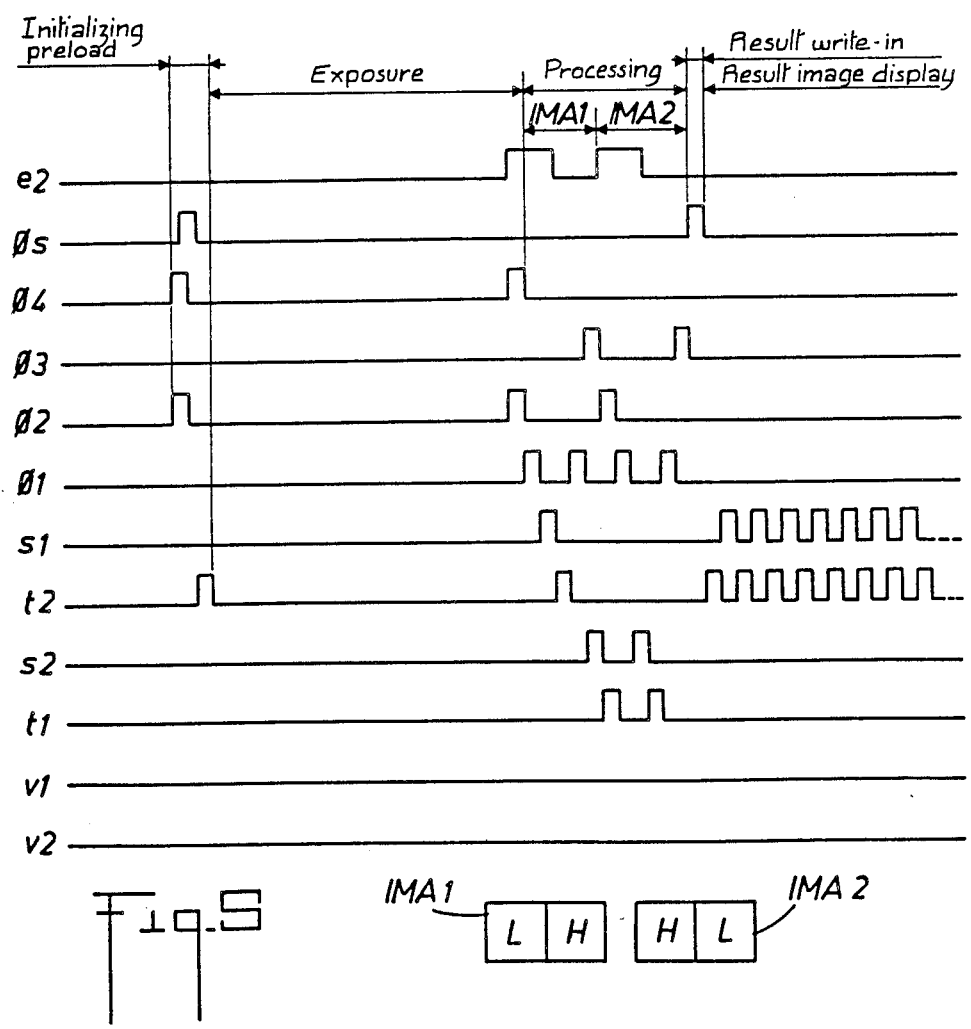
FIG. 5 is a time diagram relative to one example of utilization of the array of FIG. 1 for the acquisition of an image and an elementary processing operation for detecting a vertical edge in said image, the two predetermined elementary images used for that processing being also shown.

One example of simple elementary processing is now described with reference to FIG. 5. This example is concerned with the recognition of a vertical edge in the image to be treated. The small elementary images of reference are constituted of two horizontally juxtaposed pixels of different value: one elementary image IMA1 is constituted by a pixel of value L on the left of a pixel of value H, and the other, IMA2, by a pixel of value H, on the left of a pixel of value L (FIG. 5). The successive phases performed in each cell C (i,j) (line i, column j) are as follows:

initialization by switching on of transistors Tφ2, Tφ4 (pulses φ2, φ4), then by switching on of Ts (pulse φs) and T2 (pulse t2) in order to impose a level L in C and a level H in A, this preloading the stray capacity of photodiode 11;

exposure of the retina from the switching off of T2 (end of first pulse t2);

processing relative to the first elementary image IMA1 comprising, after the initializing of gates 12b and 12c of the processor (pulses φ2 and φ4): comparison by gate 12a of e2=H (first strobe of e2) and of value e1 of pixel p (i,j) of cell C (i,j); transfer of the result of said comparison in input of gate 12b (pulses φ1 switching Tφ1 on); shift of the image to the right (pulses s1 and t2), comparison of e2=L and of value e1 of pixel p (i-1,j), transfer of the result of this second comparison in input of gate 12b (second pulse φ1); and transfer of the output of gate 12b in input of gate 12c (pulse φ3 switching Tφ3 on);

processing relative to the second elementary image IMA2 comprising, after re-initializing of gate 12b (pulse φ2): shift of the image to the left (pulses s2 and t1); comparison of e2=H with value e1 of pixel p (i,j); transfer of the result in input of gate 12b; new shift to the left; comparison of e2=L with the value of pixel p (i+1,j); transfer of the result in input of gate 12b; and transfer of output of gate 12b in input of gate 12c; and writing-in of the result in the storing circuit by switching on of Ts and output of the image received on edge of retina by successive shifts to the right (pulse-trains s1 and t2).

It will be noted that the end of the exposure of the image corresponds to the moment of the first comparison of the binary information e1 with a data e2, since the storing circuit is loaded afterwards with the binary information of a neighboring cell (shift).

According to the foregoing example, it is obvious that different NCP algorithms may be used, including the most complex ones, provided that they have been decomposed into a sequence of elementary processings realizable by means of processors 12.

But other operations than the NCP algorithms are possible with the retina according to the invention. For example, a detection of displacement may be effected by exposing an image, reversing it, re-exposing it and detecting the existence of pixels of value H in the image obtained. It is further possible to load the retina with a non-blank image introduced line by line, by operating the shift registers.

What is claimed is:

1. An integrated retina including an array of cells formed on a substrate, wherein each cell comprises:
    (a) a photosensitive element for supplying an analog signal representative of the value of one element of an image formed on the retina;
    (b) converting means connected to the photosensitive element for converting said analog signal into binary information;
    (c) storage means connected to said converting means for storing said binary information; and
    (d) an elementary processor formed on said substrate and connected to said storage means of the cell;
    the storage means being arranged as a bidimensional array of shift registers to allow the transfer of the binary information from one cell to any neighboring cell;
    the shift registers and elementary processors being connected in parallel to control inputs thereto so as to control
        (i) the acquisition of an image by simultaneous storing of the binary information representing the values of the elements of said image;
        (ii) the simultaneous transfer of binary information from each cell to any neighboring cell;
        (iii) the realization of simultaneous and parallel processings by said processors on the stored binary information; and
        (iv) the write-in of results of (iii) in the storage means.

2. A retina as claimed in claim 1, wherein the storage means of one cell are connected to those of the neighboring cells in the same line and in the same column.

3. A retina as claimed in claim 1, wherein each elementary processor comprises: at least a first data input, the first data inputs of the elementary processors being arranged to allow a same data to be transmitted in parallel and simultaneously to the processors; a second data input connected to the corresponding storage means; a data output connected to the corresponding storage means via a controllable switching element; and at least one control input, the control inputs of the processors being arranged to allow a control signal to be applied in parallel and simultaneously to the processors.

4. A retina as claimed in claim 1, wherein the photosensitive element of each cell is formed by a photodiode of which the level of charge of the associated stray capacity constitutes the signal representing the value of the corresponding image element.

5. A retina as claimed in claim 4, wherein means are provided for pre-loading said capacity to a predetermined level before exposure of the retina.

6. A retina as claimed in claim 1, wherein the converting means is a threshold element.

* * * * *